US008836157B2

(12) United States Patent
Vo

(10) Patent No.: US 8,836,157 B2
(45) Date of Patent: Sep. 16, 2014

(54) POWER GENERATION DEVICE

(76) Inventor: Hoang Luu Vo, Madison Heights, MI (US)

( * ) Notice: Subject to any disclaimer, the term of this patent is extended or adjusted under 35 U.S.C. 154(b) by 401 days.

(21) Appl. No.: 13/116,340

(22) Filed: May 26, 2011

(65) Prior Publication Data

US 2012/0299527 A1    Nov. 29, 2012

(51) Int. Cl.
| | | |
|---|---|---|
| *F03D 11/04* | (2006.01) | |
| *H02P 9/04* | (2006.01) | |
| *H01L 31/042* | (2014.01) | |
| *H01M 10/44* | (2006.01) | |
| *B60L 8/00* | (2006.01) | |
| *B60L 3/00* | (2006.01) | |
| *F03D 9/00* | (2006.01) | |

(52) U.S. Cl.
CPC .............. *F03D 11/04* (2013.01); *B60L 8/006* (2013.01); *F05B 2240/941* (2013.01); *Y02E 10/725* (2013.01); *Y02T 10/7083* (2013.01); *Y02E 10/728* (2013.01); *B60L 3/0046* (2013.01); *B60L 2200/28* (2013.01); *F03D 9/00* (2013.01); *B60L 8/003* (2013.01)
USPC ............... 290/55; 290/44; 136/244; 136/245; 180/2.2; 320/101

(58) Field of Classification Search
USPC ............... 320/101; 136/244, 245; 290/55, 44; 180/2.2
See application file for complete search history.

(56) References Cited

U.S. PATENT DOCUMENTS

| | | | |
|---|---|---|---|
| 4,261,329 A | 4/1981 | Walsh et al. | |
| 4,452,234 A | 6/1984 | Withjack | |
| 4,592,436 A | 6/1986 | Tomei | |
| 5,005,357 A | 4/1991 | Fox | |
| 5,379,596 A | 1/1995 | Grayson | |
| 5,522,943 A | 6/1996 | Spencer et al. | |
| 5,839,816 A | 11/1998 | Varga et al. | |
| 5,854,516 A * | 12/1998 | Shim ............................... 290/53 |
| 5,969,501 A | 10/1999 | Glidden et al. | |
| 6,155,892 A | 12/2000 | Gorlov | |
| 6,380,481 B1 | 4/2002 | Müller | |
| 6,417,578 B1 | 7/2002 | Chapman et al. | |
| 6,857,492 B1 | 2/2005 | Liskey et al. | |
| 7,105,940 B2 | 9/2006 | Weesner et al. | |

(Continued)

FOREIGN PATENT DOCUMENTS

| | | |
|---|---|---|
| DE | 4003513 | 8/1991 |
| JP | 2003102104 | 4/2003 |
| WO | WO 00/47448 | 8/2000 |
| WO | PCT/US2010/040256 | 6/2010 |

OTHER PUBLICATIONS

U.S. Appl. No. 12/630,010, Vo.

*Primary Examiner* — M'Baye Diao
(74) *Attorney, Agent, or Firm* — Paparella & Associates, PC; Joseph A. Paparella

(57) ABSTRACT

A power generation device for a vehicle comprises a housing adapted to removably affix to a rear of a vehicle and a rotatable support member for rotatably supporting a first device, the rotatable support member operatively connected to the housing, wherein the first device includes rotor blades for producing electrical energy when exposed to a flow of air. Further, the rotatable support member is adapted to be articulated between a range from a first position, wherein the rotatable support member and the rotor blades of the first device are disposed within the housing, and a second position, wherein the rotatable support member and the rotor blades of the first device are disposed outside of the housing.

24 Claims, 10 Drawing Sheets

(56) References Cited

U.S. PATENT DOCUMENTS

| | | | |
|---|---|---|---|
| 7,230,819 B2 | 6/2007 | Muchow et al. | |
| 7,294,939 B1 | 11/2007 | Chen | |
| 7,323,791 B2 | 1/2008 | Jonsson | |
| 7,339,286 B1 | 3/2008 | Chen | |
| 7,388,348 B2 | 6/2008 | Mattichak | |
| 7,434,636 B2 | 10/2008 | Sutherland | |
| 7,445,064 B2 | 11/2008 | Kim | |
| 7,469,541 B1 | 12/2008 | Melton et al. | |
| 7,581,934 B2 | 9/2009 | Wobben | |
| 7,808,121 B1 * | 10/2010 | Glynn | 290/55 |
| 7,883,442 B2 * | 2/2011 | Miller et al. | 476/38 |
| 2006/0137348 A1 | 6/2006 | Pas | |
| 2007/0023078 A1 | 2/2007 | Palladino | |
| 2007/0287389 A1 | 12/2007 | Pockat et al. | |
| 2008/0042446 A1 | 2/2008 | Kurtz | |
| 2008/0068782 A1 | 3/2008 | Muchow et al. | |
| 2008/0088130 A1 | 4/2008 | Wu | |
| 2008/0128187 A1 | 5/2008 | Hu | |
| 2008/0196758 A1 | 8/2008 | McGuire | |
| 2008/0266758 A1 | 10/2008 | Hurt | |
| 2009/0039705 A1 | 2/2009 | Lyman et al. | |
| 2009/0079161 A1 | 3/2009 | Muchow et al. | |
| 2009/0102415 A1 | 4/2009 | Muchow et al. | |
| 2009/0144150 A1 | 6/2009 | Sakakibara et al. | |
| 2011/0133454 A1 * | 6/2011 | Vo | 290/44 |

* cited by examiner

POWER GENERATION DEVICE

BACKGROUND OF THE INVENTION

The present invention relates to power generation devices, and more particularly to power generation devices which are removably attached to vehicles and methods thereof.

Present generation electric vehicles are designed for shorter lengths of operation and are primarily for driving in a city environment or to commute short distances. The limits of travel on these vehicles are primarily due to the battery charge level of these vehicles not being sufficient for driving longer distances. The current state of battery technology has resulted in lengthy recharge times, shorter operational periods, and the lack of an established infrastructure for efficiently charging these vehicles while away from, for example, one's home.

One solution to this problem has been to combine electric systems with internal combustion engines thereby producing a hybrid vehicle which is capable of running on the electrical system, the combustion system, or a combination of both. With these systems, the driver is able to utilize the internal combustion engine and the existing infrastructure of gas stations to drive longer distances. However, any reduction in the environmental impact of these vehicles when operating under the power of the internal combustion engine is thereby negated.

Consequently, there is a need for power generation and/or charging systems that will increase the range of these electric vehicles while reducing the time required for recharge. Accordingly, a need exists for novel systems and methods which have, among other advantages, improvements directed to the recharging of rechargeable electrical (e.g., battery) systems. Therefore, a power generation device that solves the aforementioned disadvantages and having the aforementioned advantages is desired.

SUMMARY OF THE PRESENT INVENTION

The aforementioned drawbacks and disadvantages of these former power generation devices have been identified and a solution is set forth herein by the inventive power generation device which includes a portable power generation device or system for a vehicle which comprises a housing adapted to removably affix to a rear of a vehicle. Also provided is a rotatable support member for rotatably supporting a first device, wherein the rotatable support member is operatively connected to the housing and adapted to rotate a first end of the support into and out of the housing. The first device also includes one or more rotor blades which produce electrical energy when exposed to a flow of air. Further, the rotatable support member and the first device are adapted to be articulated between a range of: from a first (e.g., stored) position, wherein the rotatable support member and the rotor blades of the first device are disposed within the housing; and a second (e.g., deployed) position, wherein the rotatable support member and the rotor blades of the first device are disposed outside of the housing.

In further exemplary embodiments, the above-identified power generation device may also include a housing which is removably affixed to the rear of a vehicle through a trailer hitch mount which may be removably received within a trailer hitch receiver on a rear of a vehicle and supported thereby. In another exemplary embodiment, the height of the housing is configured so as to be less than or equal to the distance between a first surface (e.g., lower or bottom rear portion) of a vehicle and a second surface (e.g., upper or top rear portion) of the vehicle so as to minimize any obstruction to airflow. In yet another embodiment, a second device for producing electrical energy when exposed to a source of radiant light is provided (e.g., a solar panel, a solar array, a photovoltaic device, etc.), wherein the second device is positioned on a surface of the housing which is adapted to receive radiant light. Still further yet, the housing may open to airflow therethrough, or closed: in the open configuration the rotor blades are free to rotate within the housing when the vehicle is moved via airflow through the housing; and in the closed configuration, the device may utilize an articulated cover or door which may be opened and stored when the first device is deployed. For example, the housing is closed to air flow on a first side, a second side, and a rear portion thereof when the articulated cover is in a closed position.

In yet further exemplary embodiments, the above-identified power generation device may also include rotor blades which comprise at least one axially balanced airfoil (e.g., a radially opposite pair of airfoils) wherein the airfoils have a chord length greater than a span of the airfoils. In another embodiment, the rotor blades include a first and a second end, defining respective first and second openings, wherein the first end is connected to the second end through a plurality of spaced blades. Further examples include a first end of each blade being connected to the first end of the rotor blade assembly and radially offset from a second end of each blade connected to the second end of the rotor blade, thereby forming a spiral blade configuration. Still further yet, the system may include a power storage system for storing the converted solar and wind energy. The power storage system may be, for example, disposed within the housing.

Another aspect of the present invention includes a vehicle mountable power generation device or system which includes a housing having a height less than or equal to the distance between a lower surface of a vehicle and an upper surface of the vehicle. The housing further includes a trailer hitch mount which supports the housing and which may be removably received within a trailer hitch receiver of a vehicle. The system may further include at least one pivotable support member which is operatively connected to the housing and which rotatably supports at least one wind turbine assembly, wherein the wind turbine assembly converts the kinetic energy from the wind into mechanical energy (e.g., when rotated). Further, the support member and the wind turbine assembly are adapted to be articulated, pivoted, or rotated between a range from a first stored position, wherein the support member and the wind turbine assembly are disposed within the housing, and a second deployed position, wherein the support member and the wind turbine assembly are disposed outside of the housing.

In yet further exemplary embodiments, the device includes: a first (e.g., lower) pivotable support member which is operatively connected to the housing, wherein the first support member rotatably supports a first wind turbine assembly (e.g., in a vertical direction); a second (e.g., upper) pivotable support member which is operatively connected to the housing, wherein the second support member rotatably supports (e.g., suspends) a second wind turbine assembly (e.g., in a vertical direction); wherein the first and the second support members are adapted to pivot in opposite directions when articulated between the first and the second positions. In this manner, the support arms and the wind turbines may be conveniently stored in the housing in an opposite or mirrored configuration.

In another aspect of the present invention, a power generation device which is adapted to be removably mountable to a trailer hitch of a vehicle comprises: a housing which is disposed on a support structure, wherein the height of the housing is less than or equal to the distance between a rear lower surface of a vehicle and a rear upper surface of the vehicle; the support structure includes a trailer hitch mount which is adapted to be removably received within a trailer hitch receiver of a vehicle, wherein the support structure is adapted to support the housing via the trailer hitch mount; a first or lower pivotable support member is operatively connected to the housing and rotatably supports a first wind turbine assembly in a an upwardly vertical direction; a second or upper pivotable support member is also operatively connected to the housing and rotatably supports or suspends a second wind turbine assembly in a downwardly vertical direction; wherein the first and the second wind turbines are adapted to convert the kinetic energy from the wind into mechanical energy when rotated; further, the lower and upper support members and the first and the second wind turbines are adapted to pivot between a range from a first stored position, wherein the support members and the wind turbines are disposed within the housing, and a second deployed position, wherein the support members and the wind turbines are disposed outside of the housing; and wherein the lower and the upper support members are adapted to pivot in opposite directions when moved between the first and the second positions; also included is a solar panel for producing electrical energy when exposed to a source of radiant light, wherein the solar panel is disposed on a surface of the housing which is adapted to receive radiant light; and further included is a power converting system which converts the rotational energy produced by the rotation of the wind turbines into an electrical charge; and a power storage system which stores the electrical charge of the converting system and the electrical charge of the solar panel.

In another aspect of the present invention, a trailer hitch mountable power generation device for a vehicle comprises a housing which is adapted to removably affix to a rear of a vehicle, wherein the housing is open to airflow thereby allowing airflow therethrough. For example, the sides and rear portion of the housing may be open except for structural members of the housing, or may comprise perforated sides and/or rear portions which allow airflow to move through and out the housing when the vehicle is moving. Further, a first device which includes rotor blades is operatively configured to produce electrical energy when exposed to a flow of air, and the first device is operatively connected within the housing so as to rotate when air flows through the housing. To wit, the first device need not be rotated outwardly in order to receive airflow and rather may received airflow from within the confines of the housing due to the relatively open nature of the housing. In one exemplary embodiment, the housing is open to air flow on a first side, a second side (opposite to the first side), and a rear side, and may further be open from a front side (opposite to the rear side).

And still in another aspect of the present invention, a method of charging a vehicle with a rechargeable power source is disclosed. For example: providing a vehicle with a power generation device comprising: a housing which is adapted to removably affix to a rear of a vehicle; a rotatable support member for rotatably supporting a wind turbine, wherein the rotatable support member is operatively connected to the housing; wherein the wind turbine is adapted to produce electrical energy when exposed to a flow of air; and the rotatable support member is adapted to be articulated between a range from a first position, wherein the rotatable support member and the wind turbine are disposed within the housing, and a second position, wherein the rotatable support member and the wind turbine are disposed outside of the housing; and a photovoltaic device for producing electrical energy when exposed to a source of radiant light, wherein the photovoltaic device is disposed on a surface (e.g., top, sides, and/or rear) of the housing adapted to receive radiant light. The method further includes: providing a charge sensor which is adapted to measure a charge of a rechargeable power source of the vehicle; providing a motion sensor which is adapted to measure vehicle movement; providing a first charging circuit which is adapted to charge the rechargeable power source from the wind turbine; and providing a second charging circuit which is adapted to charge the rechargeable power source from the photovoltaic device. Yet further: detecting when a charge of the rechargeable power source is reduced by a predetermined amount, and if so, activating the second charging circuit for the photovoltaic device thereby allowing the rechargeable power source to receive the charge from the photovoltaic device; detecting vehicle movement and if movement is detected, activating the first charging circuit for the wind turbine thereby allowing the rechargeable power source to receive the charge from the wind turbine; and detecting when the charge of the rechargeable power source exceeds a second predetermined amount, and if so deactivating the first and the second charging circuit so as to prevent an overcharge condition to the rechargeable power source. The method may further comprise, when movement is detected, deploying the wind turbine to a second position and activating the first charging circuit for the wind turbine thereby allowing the rechargeable power source to receive the charge generated from the wind turbine when in the second position.

Other objects, advantages, and features of the invention will become apparent upon consideration of the following detailed description and drawings. As such, the above brief descriptions set forth, rather broadly, the more important features of the present novel invention so that the detailed descriptions that follow may be better understood and so that the contributions to the art may be better appreciated. There are of course additional features that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. To wit, the power generation devices, systems, and methods of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the claims, unless so claimed.

Further, while the application of the inventive power generation device as disclosed herein will be discussed in relation to a vehicle mounted assembly, numerous other uses are envisioned and the systems disclosed herein can be utilized wherever and whenever a power source is operatively connected to (directly or indirectly), towed behind, or otherwise connected to a moving vehicle.

As such, those skilled in the art will appreciate that the conception upon which this disclosure is based may readily be used as a basis for designing other structures, methods, and systems for carrying out the several purposes of the present invention. It is important therefore that the claims are regarded as including such equivalent constructions, as far as they do not depart from the spirit and scope of the present invention.

Further, the purpose of the Abstract is to enable the United States Patent and Trademark Office, the public generally, and especially the scientists, engineers, and practitioners in the art who are not familiar with patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any manner.

These and other objects, along with the various features and structures that characterize the invention, are pointed out with particularity in the claims annexed to and forming a part of this disclosure. For a better understanding of the power generation device of the present disclosure, its advantages, and the specific traits attained by its use, reference should be made to the accompanying drawings and other descriptive matter in which there are illustrated and described the preferred embodiments of the invention.

As such, while embodiments of the power generation device are herein illustrated and described, it is to be appreciated that various changes, rearrangements, and modifications may be made therein without departing from the scope of the invention as defined by the claims.

BRIEF DESCRIPTION OF THE DRAWINGS

As a compliment to the description and for better understanding of the specification presented herein, 10 pages of drawings are disclosed with an informative, but not limiting, intention.

DETAILED DESCRIPTION OF THE PREFERRED EMBODIMENT

Further, the best mode for carrying out the invention is presented in terms of the preferred embodiment, wherein similar referenced characters designate corresponding features throughout the several figures of the drawings.

Figure 1:
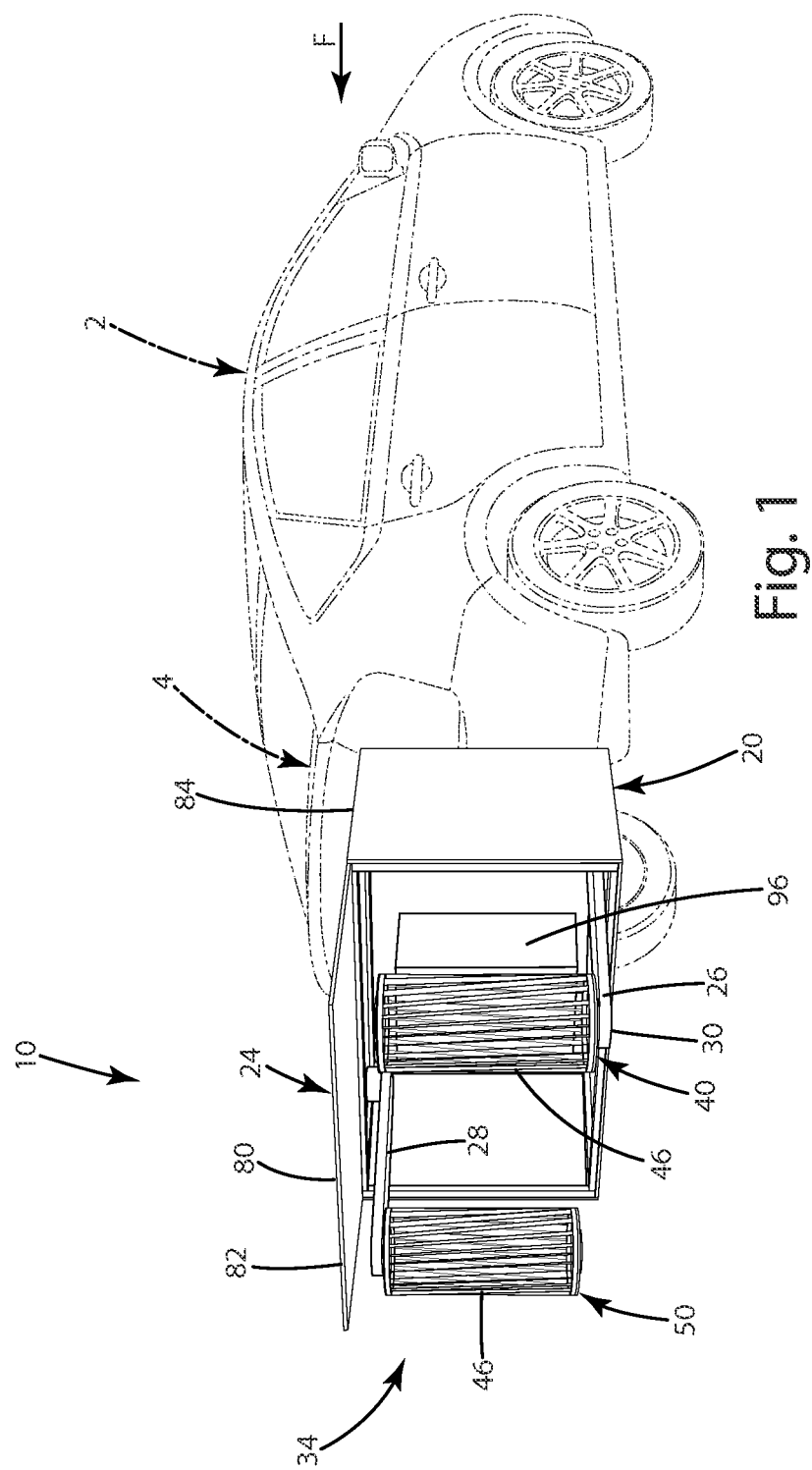
FIG. 1 is a rear perspective view of an embodiment of the power generation device of the present invention.

For purposes of description herein, the terms "upper", "lower", "right", "left", "rear", "front", "vertical", "horizontal", and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. Wherever possible, these same referenced numerals will be used throughout the drawings to refer to the same or like parts. Like features between the various embodiments utilize similar numerical designations. Where appropriate, the various similar features have been further differentiated by an alphanumeric designation, wherein the corresponding alphabetic designator has been changed. Further, the dimensions illustrated in the drawings (if provided) are included for purposes of example only and are not intended to limit the scope of the present invention. Additionally, particular details in the drawings which are illustrated in hidden or dashed lines are to be considered as forming no part of the present invention.

As used herein, the term vehicle is meant to be used and defined in its general and ordinary sense. To wit, a means of conveyance for carrying or transporting substances, objects, and people. For example, a car, truck, or the like. Of course, this is not meant to be limiting in any manner and these vehicles may take on numerous configurations, and may be used for numerous purposes as is generally known within the art.

As used herein, the term wind turbine is meant to be used and defined in its general and ordinary sense. To wit, a rotating machine which converts the kinetic energy in wind into mechanical energy. Of course, this is not meant to be limiting in any manner and these devices may take on numerous configurations, and may be used for numerous purposes as is generally known within the art.

As used herein, the term rotor blade is meant to be used and defined in its general and ordinary sense. To wit, a rotor, blade, propeller, cage, air foil, turbine, or any other structure or configuration which acts to turn in response to a flow of air. Of course, this is not meant to be limiting in any manner and these structures may take on numerous configurations, and may be used for numerous purposes as is generally known within the art.

As used herein, the term solar array, solar panel, or photovoltaic device is meant to be used and defined in its general and ordinary sense. To wit, a device that converts radiant energy into electricity. For example, a device that converts radiant energy from the sun into electrical energy. Of course, this is not meant to be limiting in any manner and these devices may take on numerous configurations, and may be used for numerous purposes as is generally known within the art.

As used herein, the term articulated is meant to be used and defined in its general, ordinary, yet broad sense. To wit, to allow movement; to be moved, opened, or closed; and regardless of a particular connection method. For example, the articulated members as disclosed herein may be hingedly, rotatingly, pivotally, or otherwise movably connected in any manner. As such, the method or device of articulation may take on numerous configurations.

In a broader and non-limiting sense, existing electric vehicles are primarily designed for short distance operation, wherein the limits of travel of these vehicles are primarily due to a battery charge capacity not being sufficient for driving longer distances. Further, existing battery technology has resulted in lengthy recharge times, short operational periods, and due to the lack of an established infrastructure for efficiently charging these vehicles, recharging these systems has become problematic.

One solution to this problem has been to combine electric systems with internal combustion engines thereby producing the hybrid vehicle which is capable of running on the electrical system, the combustion system, or a combination of both. With these hybrid systems, the driver is able to utilize the internal combustion engine and the existing infrastructure of gas stations to drive longer distances. However, any reduction in the environmental impact of these vehicles when operating under the power of the internal combustion engine is thereby negated.

Accordingly, a need exists for power generating devices and methods that allow for, inter alia, portability, ease of use, low cost, response to variable situations and environments, as well as increase the range of electric vehicles while reducing the time required to recharge such systems. Therefore, a power generating device that solves the aforementioned disadvantages and having the aforementioned advantages is disclosed herein.

While solutions to these needs are disclosed in: co-pending U.S. application Ser. No. 12/630,010, to Vo, filed on Dec. 3, 2009, entitled Power Generation Device; and PCT Application No. PCT/US2010/040256, to Vo, filed on Jun. 28, 2010 and entitled Power Generation Device, the contents of both of which are wholly incorporated herein by reference, the disadvantages and drawbacks of the prior art are also overcome through the power generation device of the present invention, wherein one preferred embodiment is disclosed in FIGS. 1-5.

Referring now to FIG. 1, there is shown a power generation device or system 10 for a vehicle 2 which includes a housing 20 which is adapted to removably affix to a rear of the vehicle 2. The device or system 10 also includes a rotatable support member 26 for rotatably supporting a first device 40 wherein the rotatable support member 26 is operatively connected to the housing so as to allow the rotatable support member 26 to rotate or pivot into and out of housing 20, and more particularly, so as to allow a first end 30 to rotate into and out of the housing 20, which allows for storage and deployment. The first device 40 includes rotor blades 46 which are adapted to produce electrical energy when exposed to a flow of air, by rotating. Further, the rotatable support member 26, and the first device 40, are adapted to be articulated, pivoted, swung, or moved between a range from a first position 32 (e.g., a stored position), wherein the rotatable support member 26 and the first device 40, including rotor blades 46, are disposed within the housing 20 (see generally FIG. 2), and a second position 34 (e.g., extended or deployed position), wherein the rotatable support member 26 and the first device 40, including rotor blades 46, are disposed outside of the housing 20 (see generally FIG. 1).

Referring now to FIG. 1, there is shown a portable power generation device 10 which comprises a housing 20, a first device 40. Although not required, the exemplary embodiment also depicts a third device 50. As such, the description herein will discuss the application of first and third device 40 and 50, respectively, however, it is to be understood that either one may be utilized alone or in combination.

Figure 2:
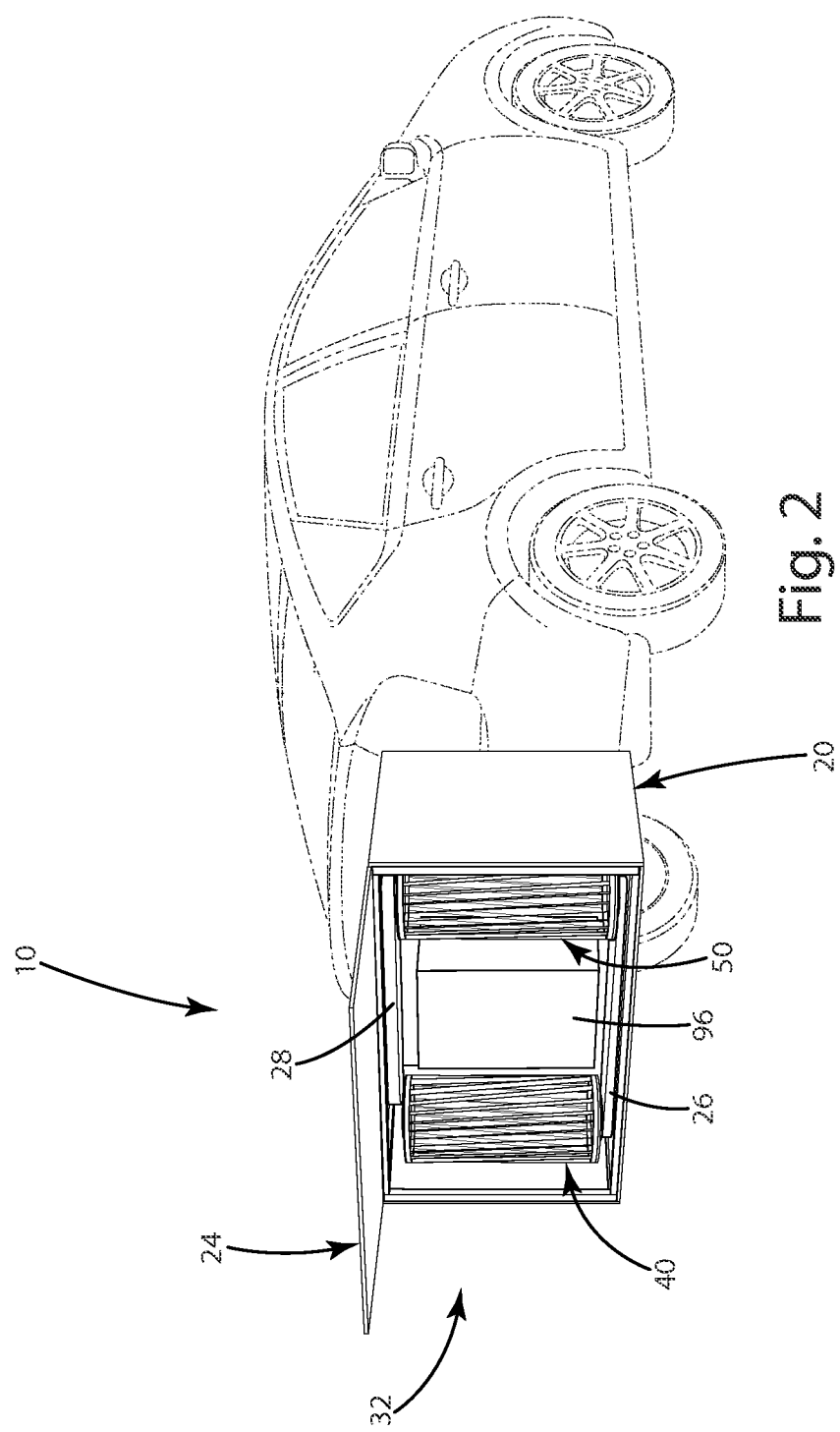
FIG. 2 is a rear perspective view of the power generation device of FIG. 1, with a first and third device in a first position.

The housing 20 includes an articulated cover 24, and a first rotatable support member 26 (e.g., upper) and, in this exemplary embodiment, a second rotatable support member 28 (e.g., lower). The first and third devices 40, 50 include rotor blades 46 for producing electrical energy when exposed to a flow of air F. First and third devices 40, 50 are adapted to be articulated, pivoted, swung, or otherwise rotated between a range from: a first stored position as illustrated in FIG. 2, wherein the rotor blades 46 and first and second rotatable support member 26, 28 are disposed within housing 20; and a second deployed position as illustrate in FIG. 1, wherein the rotor blades 46 and the first and second rotatable support member 26, 28 are disposed outside of the housing 20. Power generation device 10 may also include a second device 80 for producing electrical energy when exposed to a source of radiant light, wherein the second device 80 is disposed on a surface of housing 20 which is capable of receiving radiant light. For example, on an outside surface 82 of articulated cover 24.

Figure 3:
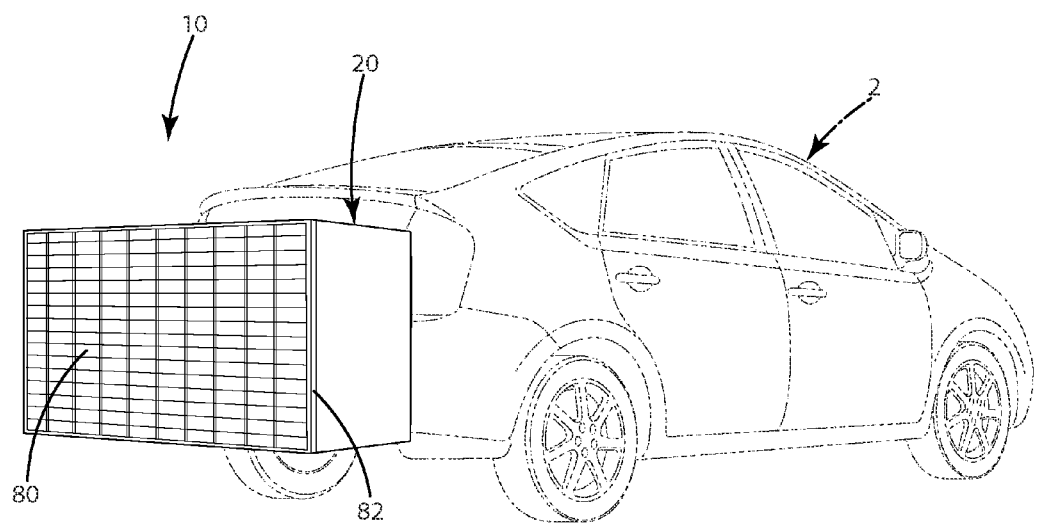
FIG. 3 is a rear perspective view of the power generation device of FIG. 1, with a closed cover.

It is also worth noting that cover 24 may be articulated such that when the cover is rotated open as depicted in FIGS. 1-2, the cover may be stored or slide on a top 84 of housing 20 so as to not extend from the housing 20 (the illustrations depict cover 24 in an extended state). Further, this arrangement may also be configured so to allow second device 80 (disposed on outside surface 82) to receive and convert radiant light when so stored or disposed (e.g., when rotated upwardly and slid into receptive channels (not shown) so as to be positioned (e.g., stored) on the top surface 84 and in a non-extending manner. Of course, second device 80 may also be configured to receive and convert radiant light when in an extended position, or when in a closed position as illustrated in FIG. 3.

As illustrated by FIG. 1, housing 20 may comprise any suitable enclosure, cover, or the like which is adapted to retain first and third devices 40, 50 in the first stored position 32; which allows for deployment of first and third devices 40, 50 to a second deployed position 34; and which is configurable to be attached to a vehicle. In one embodiment (FIG. 3), housing 20 is configured as an enclosure via first side 86, second side 88, rear side or portion 90, and front side or portion 92 which are closed to airflow. In another embodiment (FIG. 4) a housing 20' is adapted to be generally open and allow airflow therethrough, wherein first side 86, second side 88, rear side or portion 90, front side or portion 92 are open to airflow. FIG. 5 illustrates an embodiment with a single rotor blade 46 which may be rotated from a first position 32 to a second position 34. Of course, a second rotor blade may also be included as described herein-above.

In another embodiment (FIGS. 6A, 6B), the housing includes a trailer hitch mount 60 which extends from the housing such that the hitch 60 may be removably received within a trailer hitch receiver 68 disposed on a rear of vehicle 2, wherein the housing 20 are supported via the trailer hitch mount 60. With respect to housing 20, any suitable structure or framework 62 may be utilized in conjunction with housing 20 for additional support of housing 20, 20' and/or trailer hitch mount 60.

Figure 6A:
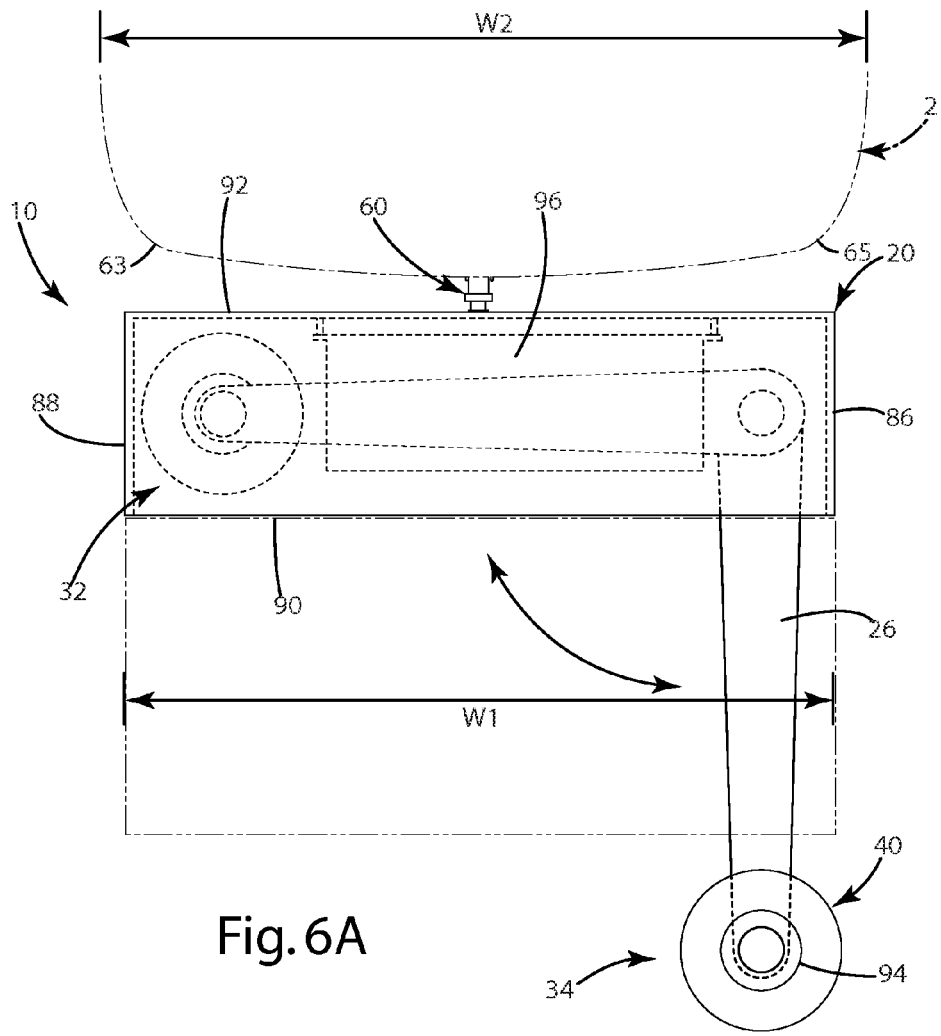
FIG. 6A is a top view of the power generation device of FIG. 5.
Figure 6B:
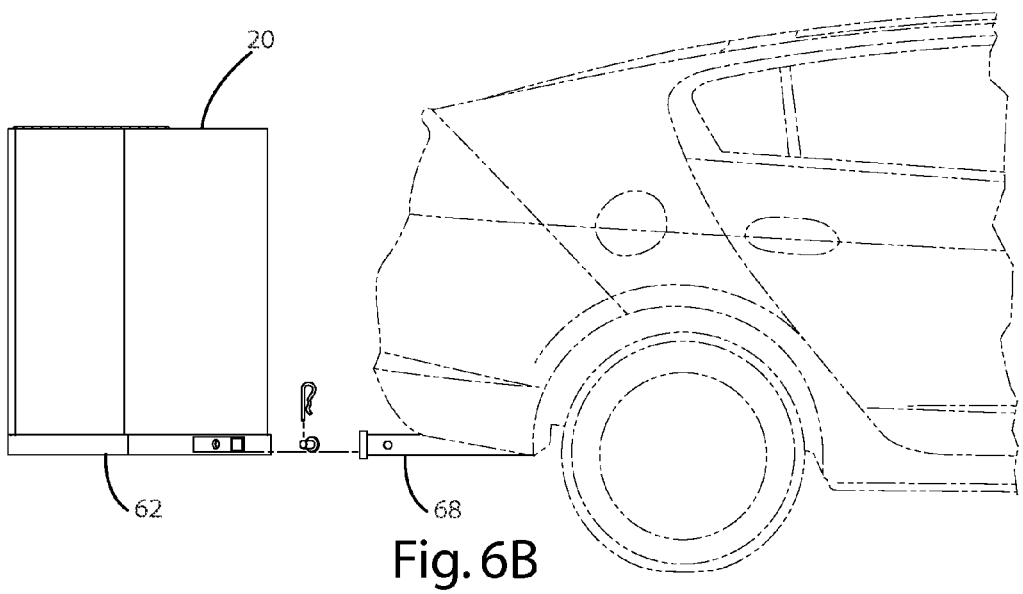
FIG. 6B is an exploded side view of one embodiment of the power generation device wherein the housing is shown rotated to a perspective view.

In the embodiments illustrated herein and as best illustrated by FIG. 6A, a width W1 (e.g., a first width) of housing or enclosure 20 will typically be less than or equal to a width W2 (e.g., a second width) of a rear portion of vehicle 2 (for example, between a first rear side 63 and a second rear side 65. Of course, housing 20 may be larger if so required. However, by limiting the width W1 of enclosure 20 to be less than or equal to the width W2, the amount of drag caused by the enclosure 20 is reduced to a minimum and therefore, any negative consequences to the vehicles aerodynamics are reduced to a minimum.

Figure 7:
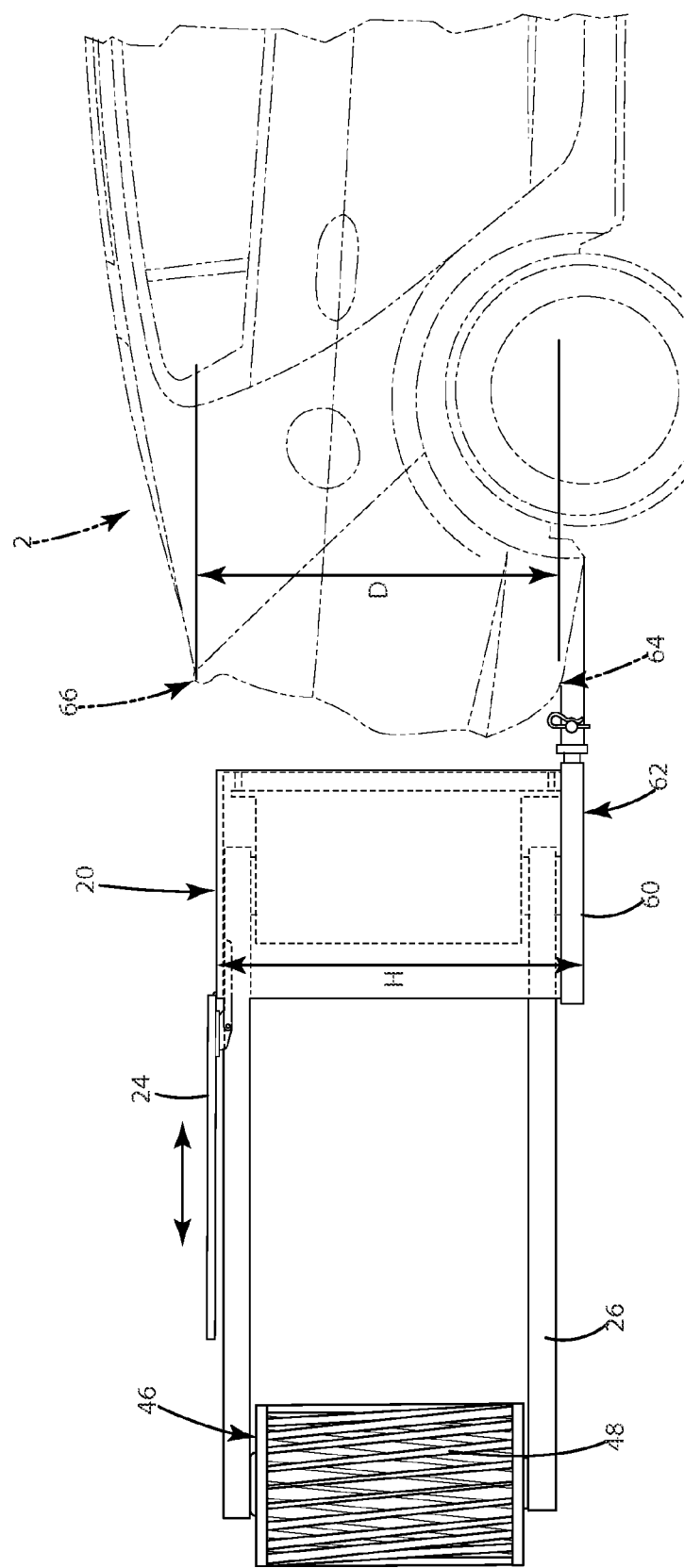
FIG. 7 is a side view of the power generation device of FIG. 1.

In the embodiments illustrated herein and as best illustrated by FIG. 7, the height H of housing or enclosure 20 will typically be less than or equal to the distance D between a first surface 64, in this case the bottom or lower rear portion of vehicle 2, and a second surface 66, in this case the upper or top rear portion of vehicle 2. Of course, housing 20 may be larger if so required. However, by limiting the height H of enclosure 20 to be less than or equal to the distance D, the amount of drag caused by the enclosure 20 is reduced to a minimum and therefore, any negative consequences to the vehicles aerodynamics are reduced to a minimum.

As described herein-above, power generation device 10 also includes at least one (e.g., a first) rotatable support member 26 for rotatably supporting first device 40 wherein the rotatable support member 26 is operatively connected to the housing so as to allow the rotatable support member 26 to rotate or pivot from a first position 32, to a second position 34, and the range therebetween. Additionally, the depicted embodiment also comprises a (e.g., a second) rotatable support member 28 for rotatably supporting third device 50 wherein the rotatable support member 28 is operatively connected to the housing so as to allow the rotatable support member 28 to rotate or pivot from a first position 32, to a second position 34, and the range therebetween. In this manner the enclosure 20 may serve to protect first and third devices 40, 50 when in the first stored position 32, while airflow is received by first and third devices 40, 50 when in the second extended position 34.

In the embodiments illustrated, first device 40 comprises a first wind turbine 42 and third device 50 comprises a second wind turbine 52, both turbins 42 and 52 being operatively connected to a power converting system or generator 94, or in any known manner, such that rotational movement of turbins 42 and 52 drives generator 94, and whereby generator 94 produces, for example, electrical energy.

Generator 94 may comprise any known device for converting the rotational movement of first and third devices 40, 50 into other forms of energy. In this embodiment, and for example only, generator 94 is operably connected to the rotor blades 46, through shaft (not shown). Of course, generator 94 may be positioned in other locations and connected to the first and third devices 40, 50 in any known manner.

Figure 8:
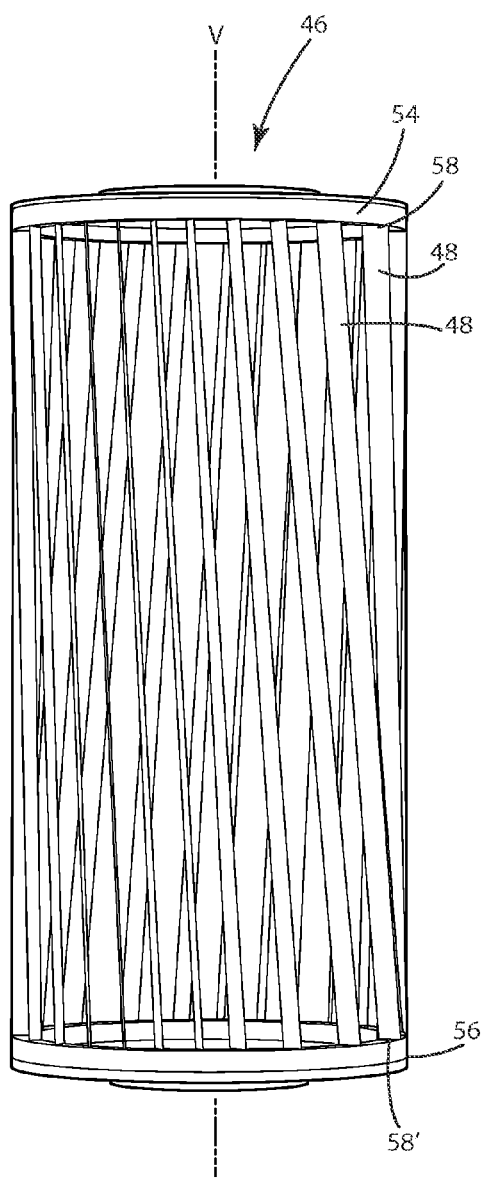
FIG. 8 is a front view of a rotor blade of the power generation device.

As illustrated by FIG. 8, first and third devices 40, 50 comprise any known devices for converting rotational kinetic energy into electrical energy. As described herein-above, first and third devices 40, 50 include rotor blades 46 for receiving airflow F, whereby airflow F causes rotation of rotating rotor blades 46 in order to produce energy. Further, first and third devices 40, 50 are adapted to be articulated between a range from a first stored position 32, illustrated in FIG. 2, wherein the rotor blades 46 of first and third devices 40, 50 are disposed within housing 20; and a second deployed position 34 as illustrated in FIG. 1, wherein the rotor blades 46 are disposed outside of the housing 20 and able to receive airflow. While first and third devices 40, 50 may comprise any device or machine which converts the kinetic energy of a moving stream of fluid (e.g., an airflow) into mechanical energy, in one preferred embodiment, first and third devices 40, 50 are first and second, respectively, wind turbines with a rotational blade assembly 46 comprising blades 48.

In the embodiment illustrated by FIG. 8, rotor blades 46 may comprise one or more spaced blades 48 which are axially balanced thereby allowing for rotational energy production. In one embodiment the rotor blades 46 comprise a first end 54 and a second end 56, the first end 54 being connected to the second end 56 through a plurality of spaced blades 48. In the illustrated embodiment, a first end 58 of each blade 48 connected to the first end 54 of the rotor blade assembly 46 is radially offset from a second end 58' of each blade 48 connected to the second end 56 of the rotor blade assembly 46, thereby forming the illustrated spiral blade configuration.

Figure 9:
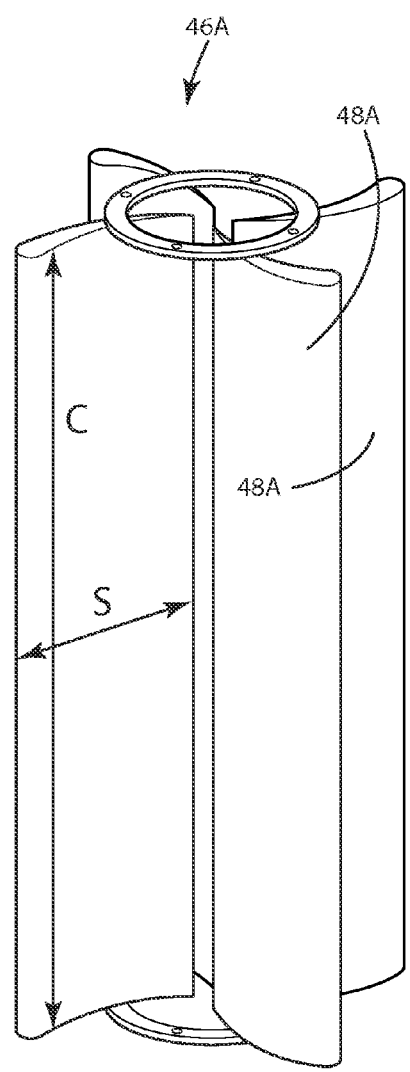
FIG. 9 is a front view of another embodiment of a rotor blade of the power generation device.

In the embodiment illustrated by FIG. 9, rotor blades 46 may also comprise axially balanced airfoils 48A, for example a pair of axially balanced airfoils, or in the illustrated embodiment, two pair of axially balanced airfoils, the airfoils having a chord length C greater than a span S of the airfoils. For example, at least one pair of airfoils 48A may be used and in the illustrated example, two pairs (e.g., four) of axially balanced airfoils are used. However, any axially balanced configuration of one or more spaced blades 48 may also be used. As such, rotor blades 46 are adapted to produce electrical energy when positioned along a vertical axis V.

As best illustrated in FIG. 3, a second device 80 for producing electrical energy when exposed to a source of radiant light is disposed on housing 20, wherein second device 80 may be disposed on any surface of housing 20 which is capable of receiving radiant light. In one embodiment, second device 80 comprises a plurality of photovoltaic devices creating a photovoltaic array or solar panel 81. For example as illustrated in FIG. 3, solar panels 81 may be disposed on a surface 82 of cover 24 in order to generate electricity when the cover is in a stored position (e.g., when rotated upwardly and slid into receptive channels (not shown) so as to be positioned (e.g., stored) on the top surface 84 and in a non-extending manner. Of course, second device 80 may also be configured to receive and convert radiant light when in an extended position, when in a closed position as illustrated in FIG. 3, or when in any other position which is capable of receiving radiant light.

As illustrated by FIG. 1, power generation device 10 may also include a power storage system 96 for storing the converted solar and wind energy/power, and in one embodiment is adapted to be disposed within housing 20. Any known power storage system may be utilized, for example, one or more batteries as is known in the art. Further, the housing 20 may also comprise one or more control systems (not shown) which are adapted to control the charging cycles of the power storage unit, the extension and retraction of rotatable support members 26, 28, or other systems as the specific requirements dictate, and any known control system may be utilized.

Still further yet, one or more motion sensors (not shown) for detecting movement (for example, movement of the vehicle) may also be utilized. This would allow the wind turbines 42, 52 to be automatically moved to the deployed position 34 when the motion sensor senses movement of vehicle. For example, when the motion sensor senses vehicle movement, and the control system or charging circuit senses that the batteries need recharge, the control system could be initiated to move the wind turbines 42, 52 into the deployed position 34, and when the control system or charging circuit senses that the batteries are fully charged, the control system could be initiated to move the wind turbines 42, 52 into the stored position 32. Of course, this may also be determined through the vehicles existing speed measuring and sensing devices by providing a connection (e.g., communication) therebetween. Again, any known motion sensor may be utilized.

When used in conjunction with a vehicle 2, power generation device 10 is able to generate electricity in most situations and at most times (e.g., day or night; and while moving or still) due to the inclusion of the first device 40 and/or third device 50, which may operate regardless of whether or not the vehicle is moving, and second device 80 for collecting and converting radiant energy (e.g., sun light). In this manner, whether vehicle 2 is parked or moving, whether it is sunny or windy, the device is capable of generating electricity and in particular, recharging the power source (for example only, the batteries) of an electric or hybrid vehicle.

For example, when parked, system 10 may utilize one or more of the wind turbines 42, 52 and the solar panels 81 to recharge the vehicles batteries or otherwise generate usable or stored power by converting ambient light and wind into electricity. In addition, when moving, system 10 may again utilize one or more of the wind turbines 42, 52 and the solar panels 81 to recharge the vehicles batteries or otherwise generate usable or stored power. Further, system 10 may store the generated electricity through storage system 96, and may also be connected, either directly or indirectly, to a vehicles power system through known connections and devices. It is also possible for system 10 to automatically activate, either alone or in combination, the wind turbines 42, 52, and the photovoltaic system 81, upon a specified threshold of battery charge. For example, known systems and methods can be employed to determine the charge level of the vehicles batteries and upon being discharged to a certain level, wherein the preferred discharge percentage may be based upon, for example, the manufacturer's recommendations, the system 10 can selectively activate, alone or in any combination, systems 40, 50, and 80. To wit, if the system 10 detects movement, the system can deploy and activate wind turbines 42, 52, and/or the array 81; as well, when required, de-activate and store (or retract) wind turbines 42, 52, and/or deactivate the array 81. Alternatively, if system 10 detects no movement, the system may deploy and activate wind turbines 42, 52 (for example when sufficient wind energy is detected via a wind sensor (not shown), and/or the array 81; as well, when required, de-activate and store wind turbines 42, 52, and/or deactivate the array 81. To wit, power generation system 10 can be activated when the batteries require a charge, and deactivated when the batteries are charged. Thus, portable power generation device 10 may be fully automated to deploy, activate, deactivate, and store according to the needs of the vehicle, whether or not the vehicle is moving, and whether or not ambient light and/or wind are available.

Figure 4:
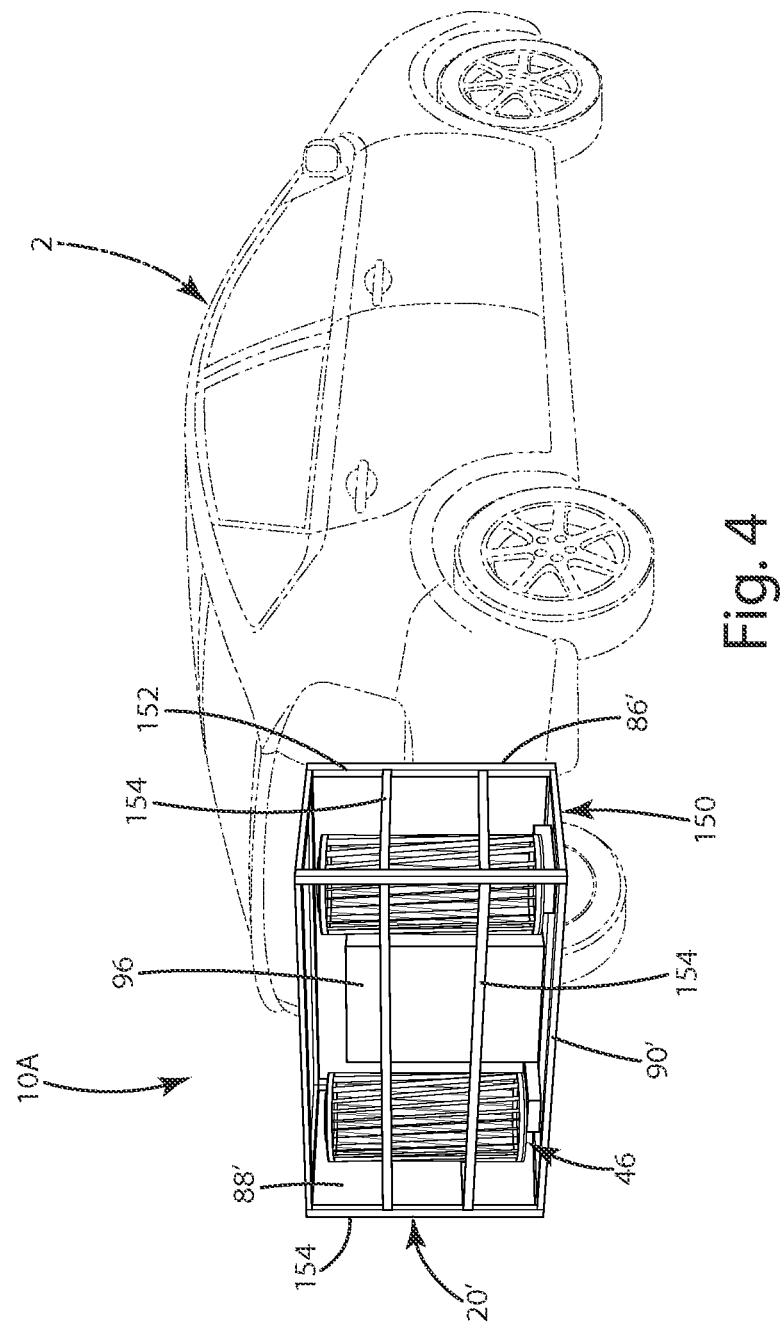
FIG. 4 is a rear perspective view of another embodiment of the power generation device.
Figure 5:
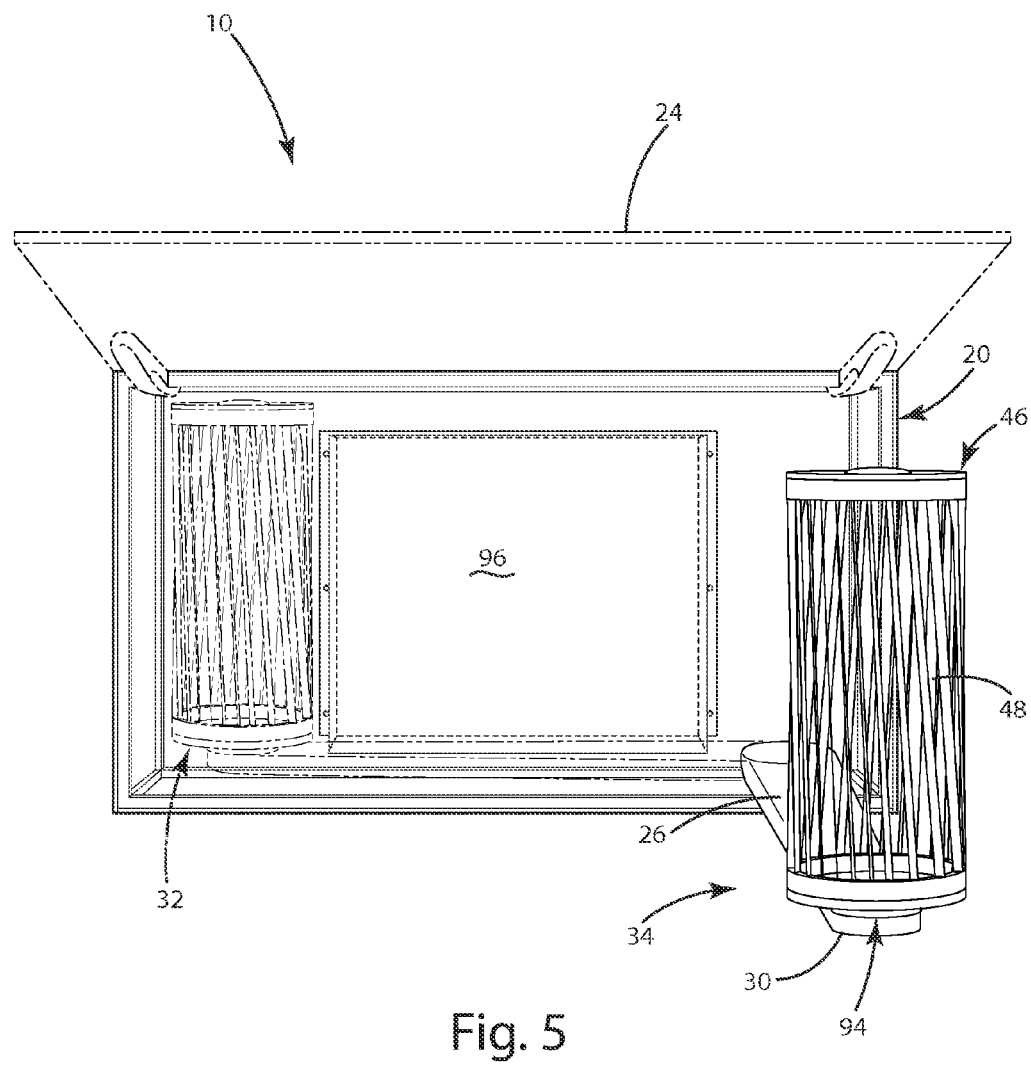
FIG. 5 is a rear view of another embodiment of the present invention.

As best illustrated in FIG. 4, an alternate embodiment 10A of a power generation device is disclosed and comprises a housing 20' which, as described herein-above, is adapted to removably affix to a rear of a vehicle. For example, via a trailer hitch 60. In this embodiment the housing 20' rather than enclosing first device 40 and/or third device 50 as depicted in FIGS. 1-3, the housing 20' is open to allow airflow therethrough. As such, and while it is possible to design such an open enclosure 20', in the embodiment illustrated it is not required to include rotatable support members 26, 28 and, for example, first device 40 and/or third device 50 may be fixedly but rotatably disposed within housing 20'. In the embodiment illustrated, the housing 20' is open to air flow on a first side 86', a second side 88', and a rear side 90'. Also depicted is a structural framework 150 for supporting first device 40, third device 50, and/or storage system 96 including, for example, vertical structural elements 152 and horizontal structural elements 154. Of course, numerous other configurations are possible.

Figure 10:
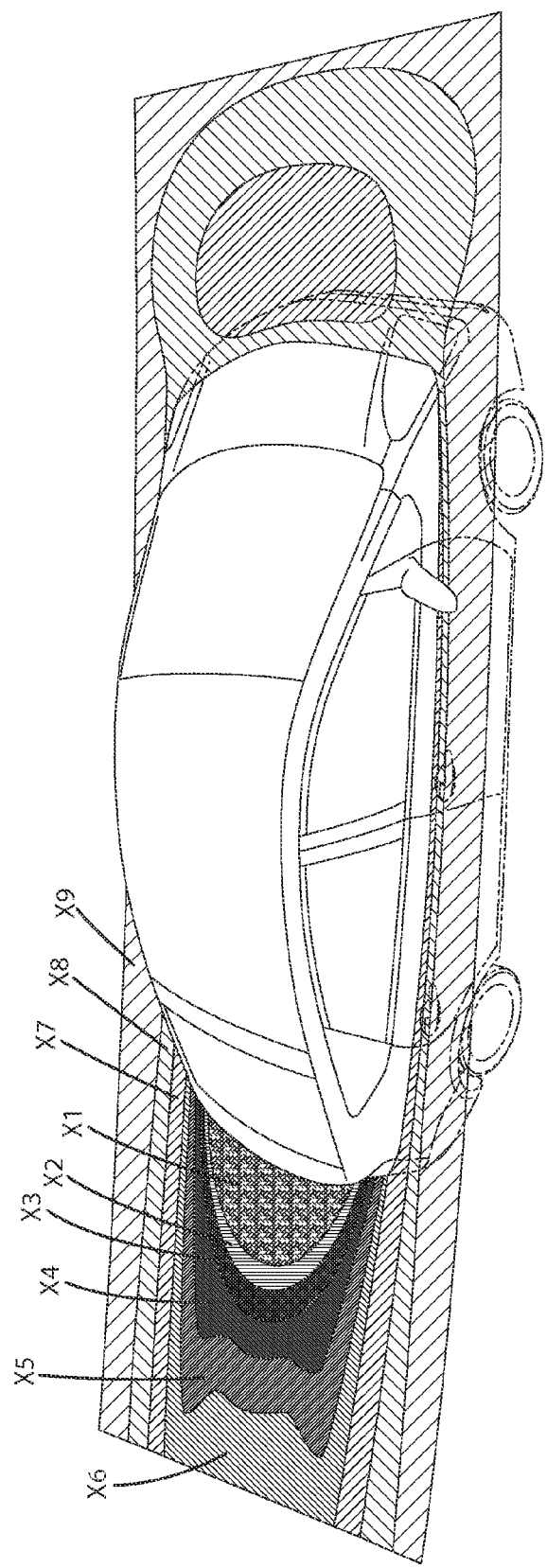
FIG. 10 is a perspective diagrammatic view of the flow of air around a vehicle.
Figure 11:
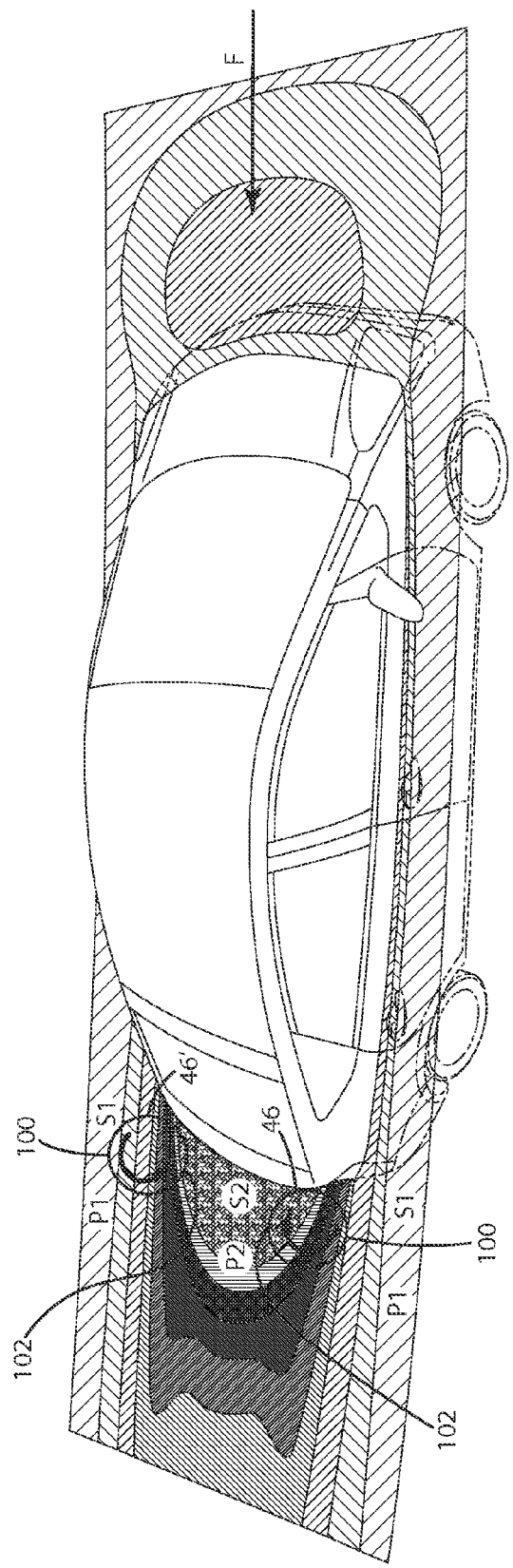
FIG. 11 is a perspective diagrammatic view of the flow of air of FIG. 10 and including a first and third device of the present invention.

Illustrated in FIG. 10 is a general flow diagram depicting representative zones X1-X9 which illustrate the wind speed behind a vehicle 2. Generally speaking, the wind speed is lowest in zone X1 and successively increases, by various amounts, to the highest speed region X9. As such, and as illustrated in FIG. 11, when the rotor blades 46 are position in the rear 4 of the vehicle 2 as illustrated, rotor 46 will rotate clockwise and rotor 46' will rotate counterclockwise. This is due to the flow (or speed) S1 of airflow F being greater on outward side 100 than the flow (or speed) S2 on inward side 102. Further, a pressure P1 on outwards side 100 will also, generally, be greater than a pressure P2 on the inwards side 102. As such, the rotors 46 and 46' are induced to rotate and thereby create electricity via generator 94 which may be stored in storage system 96 when the vehicle is moving forward. As such, some of the wind energy (and solar energy) may be converted to electricity while reducing the negative aspects (e.g., overall drag) created by positioning the system 10 elsewhere on the vehicle 2.

Also disclosed is a method of charging a vehicle with a rechargeable power source comprising the steps of providing a providing a vehicle 2 with a power generation device 10 which includes a housing 20 which is adapted to removably affix to a rear 4 of a vehicle 2. Providing a (e.g., first) rotatable support member 26 which rotatably supports, adjacent a first end 30, a (e.g., first) wind turbine 42, whereby the rotatable support member 26 is operatively connected to the housing 20 and adapted to rotate the first end 30 into and out of the housing 20, whereby the wind turbine 42 is adapted to produce electrical energy when exposed to a flow of air F. The rotatable support member 26, and the wind turbine 42 are adapted to be articulated between a range from a first (e.g., stored) position 32, wherein the rotatable support member 26 and the wind turbine 42 are disposed within the housing 20, and a second (e.g., deployed) position 34, wherein the rotatable support member 26 and the wind turbine 42 are disposed outside of the housing 20. Also provided is a photovoltaic device 81 for producing electrical energy when exposed to a source of radiant light, wherein the photovoltaic device 81 is disposed on a surface of the housing 20 which is adapted to receive radiant light. For example, this surface may be first side 86, a second side 88, and a rear side 90, or a top 84 of housing 20, or may be an outside surface 82 of articulated cover 24. Further provided is a charge sensor (not shown) adapted to measure a charge of a rechargeable power source of the vehicle 2 or a power storage system 96, and a motion sensor (not shown) which is adapted to measure the movement of vehicle 2. Yet further provided is a first charging circuit adapted to charge the rechargeable power source or the power storage system 96 from the wind turbine 42. Also provided is a second charging circuit (not shown) which is adapted to charge the rechargeable power source or a power storage system 96 from the photovoltaic device 81. The method further comprises detecting when a charge of the rechargeable power source or power storage system 96 is reduced by a predetermined amount, and if so reduced, activating the second charging circuit for the photovoltaic device 81 thereby allowing the rechargeable power source or a power storage system 96 to receive the charge from the photovoltaic device 81; detecting the movement of vehicle 2 and if movement is detected, activating the first charging circuit for the wind turbine 42 thereby allowing the rechargeable power source or power storage system 96 to receive the charge from the wind turbine 42; and detecting when the charge of the rechargeable power source or power storage system 96 source exceeds a second predetermined amount, and if so, deactivating the first and the second charging circuit so as to prevent an overcharge condition to the rechargeable power source or power storage system 96.

The method of charging a vehicle with a rechargeable power source may further comprise the steps of, when movement is detected, deploying the wind turbine 42 to a second position 34 and activating the first charging circuit for the wind turbine 42 thereby allowing the rechargeable power source or the power storage system 96 to receive the charge generated from the wind turbine 42, via the generator 94, when in the second position 34.

The specific configurations and features of power generation device 10 may vary according to specific requirements. In one preferred embodiment, device 10 generally comprises a housing 20, a first device 40 (e.g., a turbine 42), a second device 80 (e.g., a solar array 81), and a support 62 for operatively connecting the device 10 to a rear 4 of a vehicle 2 (e.g., via hitch 60). This configuration may be fabricated from multiple components and utilizes materials, systems, and fabrication techniques that are commonly known in the art. Further yet, it is envisioned that the style or configuration of housing 20, device 40, device 80, and support 62 can be varied and numerous other configurations can be fabricated. For example, the various surfaces may be configured in any geometry to suit the particular needs.

Further, the method of charging a vehicle 2 with a rechargeable power source or storage system 96 may accomplish one or more of the steps herein described, in varying order. As such, the method does not necessarily have a linear sequence of events. Therefore, while the method has been described by reference to the various steps performed therein, it is also to be understood that various modifications may be made to the method, it steps, and the like without departing from the inventive concept and that the description contained herein is merely a preferred embodiment and hence, not meant to be limiting unless stated otherwise.

Advantageously, the power generating devices and methods disclosed herein allow for, inter alia, portability, ease of use, low cost, responsiveness to variable situations and environments, and increase the range of electric vehicles while reducing the time required to recharge such systems.

The solutions offered by the invention disclosed herein have thus been attained in an economical, practical, and facile manner. To wit, a novel power generating device which is cost effective, portable, easily installed and removed, strong, responds to variable situations and environments, and increases the range of electric vehicles while reducing the time required to recharge such systems has been invented. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to be appreciated that various changes, rearrangements, and modifications may be made therein, without departing from the scope of the invention as defined by the claims.

The invention claimed is:

1. A power generation device for a vehicle comprising:
a housing adapted to removably affix to a rear of a vehicle;
a rotatable support member for rotatably supporting a first device, the rotatable support member operatively connected to the housing;
the first device including a rotor blade for producing electrical energy when exposed to a flow of air; and
the rotatable support member adapted to be articulated between a range from a first position, wherein the rotatable support member and the rotor blade of the first device are disposed within the housing, and a second position, wherein the rotatable support member and the rotor blade of the first device are disposed outside of the housing.

2. The power generation device according to claim 1 wherein:
the housing further includes a trailer hitch mount adapted to be removably received within a trailer hitch receiver disposed on a rear of a vehicle, the trailer hitch mount adapted to support the housing.

3. The power generation device according to claim 1 wherein:
a height of the housing is less than a distance between a first surface of a vehicle and a second surface of the vehicle; and
a width of the housing is less than a width of a rear surface of a vehicle.

4. The power generation device according to claim 1 further comprising:
a second device for producing electrical energy when exposed to a source of radiant light, the second device disposed on a surface of the housing adapted to receive radiant light.

5. The power generation device according to claim 1 wherein:
the housing further comprises an articulated cover.

6. The power generation device according to claim 5 wherein:
the housing is closed to air flow on a first side, a second side, and a rear portion thereof when the articulated cover is in a closed position.

7. The power generation device according to claim 1 wherein:
the rotor blade comprises at least one pair of axially balanced airfoils, the airfoils having a chord length greater than a span of the airfoils.

8. The power generation device according to claim 1 wherein:
the rotor blade comprises first and second ends, the first end connected to the second end through a plurality of spaced blades.

9. The power generation device according to claim 8 wherein:
a first end of each spaced blade, connected to the first end of the rotor blade, is radially offset from a second end of each spaced blade, connected to the second end of the rotor blade, thereby forming a spiral blade configuration.

10. The power generation device according to claim 4 further comprising:
a power storage system for storing solar and wind energy, the power storage system adapted to be disposed within the housing.

11. A vehicle mountable power generation system comprising:
a housing, wherein a height of the housing is less than or equal to a distance between a rear lower surface of a vehicle and a rear upper surface of the vehicle and wherein a first width of the housing is less than or equal to a second width of a rear portion of the vehicle;
the housing including a trailer hitch mount adapted to be removably received within a trailer hitch receiver disposed on a rear of the vehicle, the trailer hitch mount adapted to support the housing;
at least one pivotable support member operatively connected to the housing, the at least one support member rotatably supporting at least one wind turbine assembly;
the wind turbine assembly adapted to convert kinetic energy from the wind into mechanical energy when rotated; and the support member and the wind turbine assembly adapted to be articulated between a range from a first stored position, wherein the support member and the wind turbine assembly are disposed within the housing, and a second deployed position, wherein the support member and the wind turbine assembly are disposed outside of the housing.

12. The power generation system according to claim 11 further comprising:
a first lower pivotable support member operatively connected to the housing, the first support member rotatably supporting a first wind turbine assembly in a vertical direction; and
a second upper pivotable support member operatively connected to the housing, the second support member rotatably supporting a second wind turbine assembly in a vertical direction; and
the first and the second support members adapted to pivot in opposite directions when articulated between the first and the second positions.

13. The power generation system according to claim 12 further comprising:
A solar panel for producing electrical energy when exposed to a source of radiant light, the solar panel disposed on a surface of the housing adapted to receive radiant light.

14. The power generation system according to claim 13 wherein:
the housing further comprises an articulated cover and the housing is closed to air flow on a first side, a second side, and a rear side when the articulated cover is in a closed position.

15. The power generation system according to claim 13 wherein:
the wind turbine assembly comprises at least one pair of axially balanced airfoils, the airfoils having a chord length greater than a span of the airfoils.

16. The power generation system according to claim 13 wherein:
the wind turbine assembly comprises first and second ends, the first end connected to the second end through a plurality of spaced blades.

17. The power generation system according to claim 16 wherein:
a first end of each spaced blade, connected to the first end of the wind turbine, is radially offset from a second end of each spaced blade, connected to the second end of the wind turbine, thereby forming a spiral blade configuration.

18. The power generation system according to claim 14 further comprising:
a power storage system for storing solar and wind energy created by the solar panel and wind turbine, the power storage system adapted to be disposed within the housing.

19. A power generation device removably mountable to a trailer hitch of a vehicle comprising:
a housing, wherein a height of the housing is less than a distance between a rear lower surface of a vehicle and a rear upper surface of the vehicle and wherein a width of the housing is less than a width of a rear portion of the vehicle;
the housing including a trailer hitch mount extending therefrom and adapted to be removably received within a trailer hitch receiver disposed on a rear of the vehicle, the trailer hitch mount adapted to support the housing;
a lower pivotable support member operatively connected to the housing, the lower support member rotatably supporting a first wind turbine assembly in a an upwardly vertical direction;
a upper pivotable support member operatively connected to the housing, the upper support member rotatably suspending a second wind turbine assembly in a downwardly vertical direction;
the first and the second wind turbines adapted to convert kinetic energy from the wind into mechanical energy when rotated;
the lower and upper support members and the first and the second wind turbines are adapted to pivot between a range from a first stored position, wherein the support members and the wind turbines are disposed within the housing, and a second deployed position, wherein the support members and the wind turbines are disposed outside of the housing;
wherein the lower and the upper support members are adapted to pivot in opposite directions when moved between the first and the second positions;
a solar panel for producing electrical energy when exposed to a source of radiant light, the solar panel disposed on a surface of the housing adapted to receive radiant light;
a power converting system for converting rotational energy produced by the rotation of the wind turbines into an electrical charge; and
a power storage system for storing the electrical charge of the power converting system and the electrical charge of the solar panel.

20. The power generation device according to claim 19 wherein:
the wind turbine assembly comprises at least one axially balanced airfoil, the airfoil having a chord length greater than a span of the airfoils.

21. The power generation device according to claim 19 wherein:
the first and the second wind turbine assembly comprise first and second ends, the first end connected to the second end through a plurality of spaced blades.

22. The power generation device according to claim 21 wherein:
a first end of each blade connected to the first end of the first and second wind turbine assembly is radially offset from a second end of each blade connected to the second end of the first and second wind turbine assembly, thereby forming a spiral blade configuration.

23. A method of charging a vehicle with a rechargeable power source comprising:
providing a vehicle with a power generation device comprising:
a housing adapted to removably affix to a rear of a vehicle;
a rotatable support member for rotatably supporting a wind turbine, the rotatable support member operatively connected to the housing;
the wind turbine adapted to produce electrical energy when exposed to a flow of air; and
the rotatable support member and the wind turbine adapted to be articulated between a range from a first position, wherein the rotatable support member and the wind turbine are disposed within the housing, and a second position, wherein the rotatable support member and the wind turbine are disposed outside of the housing; and
a photovoltaic device for producing electrical energy when exposed to a source of radiant light, the photovoltaic device disposed on a surface of the housing adapted to receive radiant light;

providing a charge sensor adapted to measure a charge of a power storage system;

providing a motion sensor adapted to measure vehicle movement;

providing a first charging circuit adapted to charge the power storage system from the wind turbine;

providing a second charging circuit adapted to charge the power storage system from the photovoltaic device;

detecting when a charge of the rechargeable power source is reduced by a predetermined amount, and if so;

activating the second charging circuit for the photovoltaic device thereby allowing the power storage system to receive the charge from the photovoltaic device;

detecting vehicle movement and if movement is detected;

activating the first charging circuit for the wind turbine thereby allowing the power storage system to receive the charge from the wind turbine; and detecting when the charge of the power storage system exceeds a second predetermined amount, and if so deactivating the first and the second charging circuit so as to prevent an overcharge condition to the power storage system.

24. The method of charging a vehicle according to claim 23 wherein:

when movement is detected; and deploying the wind turbine to a second position and activating the first charging circuit for the wind turbine thereby allowing the power storage system to receive the charge generated from the wind turbine when in the second position.

* * * * *